(12) United States Patent
Dubief et al.

(10) Patent No.: US 12,004,549 B2
(45) Date of Patent: Jun. 11, 2024

(54) APPARATUS AND METHOD FOR ROASTING COFFEE BEANS

(71) Applicant: SOCIETE DES PRODUITS NESTLE S.A., Vevey (CH)

(72) Inventors: Flavien Dubief, Champagne (CH); Stefano Ceccaroli, Chavornay (CH); Nicolas Bigler, Morrens (CH)

(73) Assignee: Societe des Produits Nestle S.A., Vevey (CH)

( * ) Notice: Subject to any disclaimer, the term of this patent is extended or adjusted under 35 U.S.C. 154(b) by 93 days.

(21) Appl. No.: 17/288,699

(22) PCT Filed: Oct. 25, 2019

(86) PCT No.: PCT/EP2019/079238
§ 371 (c)(1),
(2) Date: Apr. 26, 2021

(87) PCT Pub. No.: WO2020/084134
PCT Pub. Date: Apr. 30, 2020

(65) Prior Publication Data
US 2021/0392939 A1  Dec. 23, 2021

(30) Foreign Application Priority Data
Oct. 26, 2018  (EP) ..................... 18202851

(51) Int. Cl.
*A23N 12/12*  (2006.01)
*A23F 5/04*  (2006.01)
(52) U.S. Cl.
CPC .............. *A23N 12/125* (2013.01); *A23F 5/04* (2013.01)

(58) Field of Classification Search
CPC .......... A23F 5/04; A23N 12/08; A23N 12/125
USPC ......................................................... 426/466
See application file for complete search history.

(56) References Cited

U.S. PATENT DOCUMENTS

| | | |
|---|---|---|
| 5,928,697 A | 7/1999 | Argiles Felip |
| 6,065,226 A | 5/2000 | Gell, Jr. |
| 6,942,887 B1 | 9/2005 | Freedman |
| 7,285,300 B1 | 10/2007 | Allington et al. |
| 2003/0061942 A1 | 4/2003 | Erickson et al. |
| 2009/0238929 A1 | 9/2009 | Freedman |
| 2013/0180406 A1 | 7/2013 | Hay et al. |
| 2017/0360242 A1 | 12/2017 | Boggavarapu |

FOREIGN PATENT DOCUMENTS

| | | |
|---|---|---|
| CN | 1037086 A | 11/1989 |
| CN | 105768930 A | 7/2016 |
| CN | 105939643 A | 9/2016 |

(Continued)

OTHER PUBLICATIONS

Russian Office Action for Appl No. 2021114171/10 dated Apr. 18, 2023.

(Continued)

*Primary Examiner* — Subbalakshmi Prakash
(74) *Attorney, Agent, or Firm* — K&L Gates LLP

(57) ABSTRACT

The invention concerns a method for roasting coffee beans with a roasting apparatus (10) said roasting apparatus being positioned in a room and said roasting apparatus comprising: •—a roasting device (1), and •—a smoke treating unit (3) configured to treat the smoke produced in the roasting device (1) and to prevent the dispense of air contaminants in the room.

12 Claims, 5 Drawing Sheets

(56) References Cited

FOREIGN PATENT DOCUMENTS

| | | |
|---|---|---|
| EP | 0896794 | 2/1999 |
| EP | 1442262 B1 | 12/2015 |
| JP | H03134 A | 1/1991 |
| RU | 2009123097 A | 2/2011 |
| WO | 2013192502 A1 | 12/2013 |

OTHER PUBLICATIONS

Japanese Office Action for Appl No. 2021-518899 dated Jun. 20, 2023.
Brazil Office Action for Appl No. BR112021005442-1 dated Jul. 13, 2023.
Russian Office Action for Appl No. 2021114171/10 dated Oct. 16, 2023.
Russian Office Action for Appl No. 2021114171/10 dated Feb. 19, 2024.

APPARATUS AND METHOD FOR ROASTING COFFEE BEANS

CROSS REFERENCE TO RELATED APPLICATIONS

The present application is a National Stage of International Application No. PCT/EP2019/079238, filed on Oct. 25, 2019, which claims priority to European Patent Application No. 18202851.4, filed on Oct. 26, 2018, the entire contents of which are being incorporated herein by reference.

FIELD OF THE INVENTION

The present invention relates to apparatuses for roasting coffee beans in a safe environment.

BACKGROUND OF THE INVENTION

The roasting of coffee beans is a well-known process. The main steps consists in heating the beans to a desired roasting level and then cooling or quenching the heated beans to stop the roasting. During heating, smoke is emitted. This smoke contains safe and desired components all together, in particular the usual roasted coffee aroma, but also undesired less safe components such as pyridine, 2-furane methanol, caffeine furfural, formaldehyde, acetaldehyde, CO, $CO_2$, $NO_2$ and particulate matters (PM2.5, PM10), . . . .

When roasting is implemented in manufacturing places producing important quantities of roasted beans, generally all the conditions for catching unsafe components are supplied and there is no interest for catching aroma.

With small home roasting apparatus, being able to smell the aroma during the roasting operation can be important to monitor the roasting completion. U.S. Pat. No. 6,942,887 proposes a roaster wherein the smoke is passed through a filter medium that blocks particle matter emission but not the aromas to aid the operator; this filter medium comprises a white filter medium, like a HEPA filter, and an odor filter, like a carbon filter, that does not block all odors.

U.S. Pat. No. 6,025,226 proposes a home roaster with a similar particle and oil filter for smoke generated during the roasting process; again the filter is preferably a HEPA filter like non-woven polyester fabric enabling aroma to pass through. A bypass of the filter is provided to guarantee a high gas flow during the step of collection of chaffs; during this step, smoke is not treated at all and all contaminants are sent to the atmosphere.

Now, there is a recent trend to implement small batch roasting with small roasters in shops, restaurants and coffees where customers are able to consume coffee brewed from freshly roasted beans. The roaster does not only provide freshness and theater advantages, but also dispenses the pleasant roasted coffee aroma inside the shop or coffee.

Yet, as mentioned above, harmful components are emitted too. When the roaster is frequently used in a closed environment like a shop, coffee or restaurant, the emission of some components can become harmful depending on the size of the room, the ventilation of the room, . . . . For people working several hours in the room, smelling the smokes of the roaster can lead to a health problem.

As a result, in such an environment, it is recommended to stop the emission of smoke from the roaster to avoid any healthy issue for people present in the shop. The existing solutions consist in filters to catch components or catalytic converters to destroy the components or in dispensing the smoke through a duct and a smoke driver outside the room.

Yet the disadvantage of these solutions is that the aromas of the roasted coffee beans are caught or destroyed simultaneously with the direct drawback of reducing the impact of the use of small roasters in shops of coffees.

An object of the present invention is to provide a method for roasting coffee beans in a room enabling the reduction of emission of harmful gaseous components while enabling the emission of safe and pleasant gaseous aromas.

SUMMARY OF THE INVENTION

In a first aspect of the invention, there is provided a method for roasting coffee beans with a roasting apparatus said roasting apparatus being positioned in a room and said roasting apparatus comprising:
  a roasting device, and
  a smoke treating unit comprising a contaminants treating device configured to treat the smoke produced in the roasting device and to prevent the dispense of air contaminants, including coffee aromas, in the room,
  said roasting method comprising the step of introducing coffee beans in the roasting device and the step of heating said coffee beans during a time, and
  wherein a part of the whole quantity of smoke produced during the time of the step of heating is dispensed in the room without being treated by said contaminants treating device. configured to prevent the dispense of coffee aromas in the room.

The roasting method is implemented in a roasting apparatus comprising a roasting device and a smoke treating unit configured to treat the smoke produced in the roasting device. Generally, the roasting device and the smoke treating unit are part of one single roasting apparatus. Alternatively, the roasting apparatus can be the combination of two sub-modules: the roasting device on one hand and the smoke treating unit on the other hand.

Any type of roasting device can be used. In the roasting device, coffee beans are heated and preferably mixed to homogenise heating through the beans.

The source of heating can be a burner (meaning combustion) fed by natural gas, liquefied petroleum gas (LPG) or even wood. Alternatively the heat source can be an electrical resistor, a ceramic heater, a halogen source, a source of infrared or of microwaves.

Preferably the source of heating is electrically powered so that the air contaminants produced during the roasting are contaminants generated from the heating of coffee beans themselves only and not from the burning of gases as it happens when the source of heating is a gas burner using natural gas, propane, liquefied petroleum gas (LPG) or even wood.

The mixing of the beans can be obtained with a fluidic bed of hot air or mechanically with stirring blades or a rotating drum.

Preferably the roasting device is hot air fluid bed chamber. Within such a chamber, heated air is forced through a screen or a perforated plate under the coffee beans with sufficient force to lift the beans. Heat is transferred to the beans as they tumble and circulate within this fluidized bed.

Alternatively the roasting device can be a drum chamber wherein the coffee beans are tumbled in a heated environment. The drum chamber can consist of a drum rotating along a horizontal axis or the drum chamber can comprise stirring blades to tumble the coffee beans in a heated environment.

By contaminants treating device configured to treat the smoke produced in the roasting device and to prevent the dispense of air contaminants in the room, it is understood indifferently an active treating device that destroys contaminants inside the apparatus (such as a catalytic converter) or a passive treating unit that retains contaminants inside the apparatus (such as a filter) or that diverts contaminants away from the room (such as a tube connected to the outside of the room) or that traps and converts contaminants (such an electrostatic precipitator).

An active device that destroys contaminants can be an afterburner that thermally oxidises the contaminants like CO and $CO_2$ at very high temperatures, generally above 700° C., and converts them into ashes. An afterburner destroys coffee aromas.

Alternatively and preferably, an active device can be a catalytic converter that comprise a ceramic substrate coated with a catalytic impregnating agent containing noble metals, such as nanoparticles of copper oxide, nanoparticles of iron oxide, and typically one or more metals of the platinum group (platinum, palladium, rhodium). The operation of the catalytic afterburner requires a lower temperature than an afterburner: the temperature is generally comprised between 300° C. and 500° C. Conveniently, although not necessarily, before the smoke is passed into the catalytic converter, it is pre-heated, generally by means of a heat-exchanger fed with the smoke emerging from the catalytic converter. A catalytic converter destroys coffee aromas.

A passive device is usually a filter unit able to retain VOCs and particulate matters (PM). The filter unit can comprise different types of filters such as filters configured for trapping VOCs (volatile organic compounds) and hydrocarbons (for example carbon filter/charcoal filter) and filters configured for trapping particulate matters (for example high efficiency particulate accumulator (HEPA) filters) and filters configured for trapping chaff fines (for example ultrafine steel wool media filter).

The smoke treating unit can comprise one or a combination of contaminants treating devices such as described above.

According to the invention, the smoke treating unit comprises at least one contaminants treating device configured to prevent the dispense of coffee aromas in the room. According to the preferred embodiment, the contaminants treating device configured to prevent the dispense of air contaminants, including coffee aromas, in the room can be an afterburner or a catalytic converter or a device that diverts contaminants away from the room or a filter configured to trap coffee aromas.

In addition to the at least one contaminants treating device configured to prevent the dispense of coffee aromas in the room, the smoke treating unit can comprise at least one other contaminants treating device configured to prevent the dispense of other contaminants than coffee aromas in the room. In particular, the smoke treating unit can comprise an additional filter configured to trap particulate matter essentially.

The roasting method is implemented with a roasting apparatus positioned in a room and accordingly with the smoke treating unit positioned in the room since the smoke treating unit is part of the roasting apparatus. For example, the room can be a coffee or a shop.

The roasting method comprises a step of heating coffee beans introduced in the roasting device. The temperature can be comprised between 180 and 250° C. The end of the heating step is usually followed by a step of cooling the beans. Cooling is usually implemented by stopping heating and eventually adding air or even water in the chamber of the roasting device or discharging the roasted beans from the roasting device. Reaching a temperature of 40° C. is sufficient to stop roasting.

The timelength of the step of heating depends on the nature of the coffee beans and the desired final roasting level of the beans.

During heating, the beans produce smoke that is usually treated. Yet in the present process, a part of the whole quantity of smoke produced during the time of the step of heating is dispensed in the room without being treated by the contaminants treating device. As a result, a first part of the whole quantity of smoke produced during the heating step is dispensed inside the room without being treated, meaning that a part of the aroma produced during the step of roasting is dispensed in the room directly. A part of the aromas are not filtered or destroyed and their pleasant smell can be smelt in the room.

The second complementary part of the whole smoke is treated by the contaminants treating device. Consequently, the risk that too important levels of air contaminants are dispensed in the room is prevented.

Preferably, the part of the whole quantity of smoke produced during the time of the step of heating and dispensed in the room without being treated by the contaminants treating device configured to prevent the dispense of coffee aromas in the room is set according to the desired smell of aroma in the room and health regulations about the presence of specific compounds in a public room.

The method enables the operator to control the level of aroma dispensed in the room by setting the ratio of non-treated smoke to the whole smoke.

The part of the whole quantity of smoke produced during the time of the step of heating and dispensed in the room without being treated by the contaminants treating device can be adjusted based on the size of the room, the ventilation of the room, the hour of the day, the frequency of the roasts, the quantity of roasted beans, the desired roasting level and/or depending on local health regulations about the presence of specific compounds in a public room.

According to one first mode, during a part of the time of the step of heating, at least a part of the smoke produced in the roasting device is dispensed in the room without being treated by the contaminants treating device configured to prevent the dispense of coffee aromas in the room.

The part of the time during which the whole smoke or a part of the smoke is dispensed without treatment can be divided in separate periods of time periodically distributed or not along the time of the step of heating.

Alternatively, the part of the time during which the whole smoke or a part of the smoke is dispensed without treatment can be a single part of the time of the step of heating, preferably happening at the beginning of the step of heating the coffee beans.

In this first mode, preferably, during a sub-step of the step of heating, an important level of coffee aromas are produced, and during said sub-step, at least a part of the smoke produced in the roasting device is dispensed in the room without being treated by the contaminants treating device configured to prevent the dispense of coffee aromas in the room.

In this first mode, preferably, the step of heating coffee beans during a time consists in one first period of time and one second period of time, and during at least a part of the first period of time, at least a part of the smoke produced in the roasting device is dispensed in the room without being treated by the contaminants treating device, and during the second period of time, at least a part of the smoke is treated by the contaminants treating device.

Usually, the second period of time happens after the first crack of the coffee beans.

Depending on the length of the time of roasting and the level of roasting set for the beans (light or dark), the second period of time of the step of heating can begin at a time comprised between:

after the first crack step of the coffee beans (if for example the roasting time is set to provide light roasted beans and the second crack is not reached), and just after the second crack of the coffee beans (if for example the roasting time is set to provide dark roasted beans and the second crack is passed by).

In the method of roasting, the step of heating is divided in two periods and consists in a first period and a second period. Usually, the end of the first period—corresponding also to the beginning of the second period—is set after the first crack step of the beans and before the end of the second crack step of the beans or even at the end of the second crack step.

Depending on the nature of the coffee beans introduced in the roasting device, during the first period of time, the smoke produced in the roasting device can be dispensed in the room without being treated by the contaminants treating device during the whole length of the first period of time or alternatively during a part of the time length of the first period of time.

If the coffee beans introduced in the vessel are green beans, during the first part of the first period of time of heating, green beans are dried; as a result water vapour is released and special odours similar to roasted peanuts and hay can be smelt. These types of odours are not desired inside a shop, café or restaurant. Accordingly, it is preferred having smoke treated by the contaminants treating device during this first part of the first period of heating. On the contrary, during the second part of the first period, where the first crack of the beans is reached, typical and desired roasted coffee aromas are created and at least a part of the smoke is not treated by the contaminants treating device configured to prevent the dispense of coffee aromas in the room.

If the coffee beans introduced in the roasting device are partially pre-roasted beans, the first part of the first period of time of heating beans and corresponding to green beans drying does not happen and the need to treat the smoke during a part of the first period of time is less critical.

Based on the above, during the first period of time of the step of heating, at least a part of the smoke can be diverted from the contaminants treating device during said whole first period (for partially pre-roasted beans) or during a part of said first period only (for green beans and for partially pre-roasted beans).

It is known that, during the first crack of coffee beans, aromas are released from the beans due to Maillard reaction. To enable the aromas generated from said Maillard reaction to diffuse in the room, at least a part of the smoke produced in the roasting device during the first crack is dispensed in the room without being treated by the contaminant treating device configured to prevent the dispense of coffee aromas in the room. As a result, these pleasant aromas are dispensed.

Simultaneously it has been noticed that the part of harmful components emitted before the end of the second crack is reached remains rather low, meaning that not treating the smoke during the first period of time of the heating has no health impact even if emitted in a small room. It means that at least a part of the smoke can be dispensed as such in the room during the first period.

On the contrary, during the second step of heating beginning just after the end of the second crack, important levels of harmful components are usually observed. Accordingly, it is recommended to treat at least a part of the smoke emitted during said second period. Accordingly, during this second period, the contaminants in the smoke are treated.

According to one second mode, during the time of the step of heating, one first part of the smoke produced in the roasting device is dispensed in the room without being treated by the contaminants treating device configured to prevent the dispense of coffee aromas in the room and one second complementary part of the smoke produced in the roasting device is treated by the contaminants treating device configured to prevent the dispense of coffee aromas in the room.

In this second mode, the part of the whole smoke directly dispensed in the room without treatment is controlled by dividing the smoke in at least two parts and one part only is subjected to the treatment by the contaminants treating device configured to prevent the dispense of coffee aromas in the room.

Only a part of the smoke produced in the roasting device is directed to the contaminants treating device configured to prevent the dispense of coffee aromas in the room. The rest of the smoke is not treated and dispensed in the room.

The relative proportion of the two parts is set so that the part of the whole smoke directly dispensed in the room without treatment respects the level of contaminants authorised according to local health regulations.

According to the preferred embodiment, the roasting apparatus used in the method comprises:

a smoke collecting device connected to the roasting device and configured to collect smoke produced in the roasting device, and a smoke diverting device positioned between the smoke collecting device and the contaminants treating device configured to prevent the dispense of coffee aromas in the room, said smoke diverting device being configured to divert at least a part of the smoke collected by the smoke collecting device away from said contaminants treating device and directly to the outside of the roasting apparatus.

By means of this smoke diverting device, either the first mode or the second mode of the method can be implemented:

in the first mode, the smoke diverting device can be configured to divert, during a part of the time of the step of heating, at least a part of the smoke collected by the smoke collecting device away from the contaminants treating device configured to prevent the dispense of coffee aromas in the room and directly to the outside of the roasting apparatus, in the second mode, the smoke diverting device can be configured to split during the time of the step of heating, one first part of the smoke to the contaminants treating device configured to prevent the dispense of coffee aromas in the room and the second part of the smoke directly to the outside of the roasting apparatus.

According to this preferred embodiment, the treatment or the absence of treatment of the smoke is controlled by the path taken by the smoke in the roasting apparatus. The smoke can be diverted or not from the usual path driving to the contaminants treating device configured to prevent the dispense of coffee aromas in the room.

This embodiment enables the use of a passive contaminants treating device like a filter or an active contaminants treating device like a catalytic converter, which does not need to be successively switched off and on.

Preferably, the roasting apparatus of the method can comprise an air contaminants level monitoring unit configured for measuring the level of contaminants in the smoke, and during the step of heating:
- the level of contaminants in the produced smoke is measured and compared to a threshold value, and
- the treatment of the smoke by the contaminants treating device is controlled based on this comparison.

The threshold value can be defined on the basis of the volume of the room, the ventilation of the room and the local health regulation.

Preferably, the level of at least one of the following contaminants is measured: $CO$, $CO_2$, $NO$, $NO_2$.

The control of the treatment of the smoke can consist in increasing or decreasing the part of the whole smoke sent to the contaminants treating device and/or increasing or decreasing the time of treatment of the whole or a part of the smoke by the contaminants treating device.

The level of contaminants in the smoke can be measured at different positions inside the roasting apparatus such as:
- at the smoke outlet of the roasting device or at the inlet of the smoke treating unit, and/or
- downstream the contaminants treating device, and/or
- in the room and outside the roasting apparatus.

Preferably, the coffee beans introduced in the roasting device are partially pre-roasted beans, said partially pre-roasted beans having been obtained by heating green coffee beans and stopping said heating process before the end of the first crack.

The advantage of using partially roasted beans is that some aromas produced during the first period of roasting of green beans do not provide the typical pleasant aroma of roasted coffee. Accordingly these non-desired aromas can be generated in a manufacturing plant and during the subsequent roasting step inside the shop, coffee or restaurant, the pleasant aromas can be produced by the final roasting of these partially roasted beans.

According to one embodiment of the method:
- the roasting device comprises a coffee beans identification device configured for obtaining information about the coffee beans introduced in the roasting device, and
- the roasting method comprises the steps of:
  - obtaining information about the coffee beans introduced in the roasting device in order to determine directly or indirectly:
    - the heating profile to be applied, and
    - the level of air contaminants produced in the course of said heating profile or the smoke treatment to be applied,
  - and
  - heating said coffee beans according to the determined heating profile and dispensing a part of the whole smoke produced in the roasting device in the room without treatment by the contaminants treating device based on the determined level of air contaminants produced in the course of said heating profile or based on the determined smoke treatment.

In the step of obtaining information about the coffee beans, the heating profile to be applied and the level of air contaminants produced in the course of said heating profile or the smoke treatment to be applied can be part of the obtained information and the determination is direct.

Alternatively, in the step of obtaining information about the coffee beans, a reference to the coffee beans can be obtained, and, based on this reference, the heating profile and the level of air contaminants produced in the course of said heating profile or the smoke treatment to be applied can be obtained indirectly from a memory or a database within the roasting apparatus, said memory or database establishing correspondence between the reference and the information to be determined.

As a result, the smoke treatment can be provided directly or can be indirectly automatically deduced from or implemented based on the information provided by the coffee beans identification device.

In the step of obtaining information about the coffee beans, it is preferred to determine the smoke treatment to be applied rather than the level of air contaminants produced in the course of said heating profile. Actually, providing the level of contaminants implies that these data must be used to calculate the smoke treatment able to deal with these contaminants. Providing the smoke treatment is more straightforward.

Eventually, information about the smoke treatment to be applied can be adapted based on the volume of the room, wherein the roasting device is installed, the ventilation of said room, and based on the local health regulation, in particular related to the presence of specific compounds in a public room.

Information about the smoke treatment to be applied can be also customised based on the hour of the day (coffee flavours may be more desirable in the morning than in the evening), the frequency of the roasts (too frequent roasting processes may create a too strong flavour in the room), the quantity of roasted beans, the desired roasting level.

According to a second aspect, there is provided an apparatus for roasting coffee beans, said apparatus comprising:
- a roasting device, and
- a smoke collecting device configured to collect smoke produced in the roasting device, and
- a smoke treating unit comprising a contaminants treating device configured to treat the smoke collected by the smoke collecting device and to prevent the dispense of air contaminants, including coffee aromas, in the room,
- a controller arranged to control said roasting device and said smoke treating unit, wherein the controller is adapted to dispense in the room a part of the whole quantity of smoke produced during the time of the step of roasting without having this smoke treated by the contaminants treating device configured to prevent the dispense of coffee aromas in the room.

As mentioned above, any type of roasting device and any type of contaminants treating device configured to prevent the dispense of coffee aromas can be used.

The smoke collecting device is usually a hood or a chimney positioned above a smoke outlet of the roasting device. There is no need to attach the hood or chimney to the smoke outlet; usually, a short distance between the smoke outlet and the inlet of the hood or chimney is sufficient.

The smoke collecting device can be a duct attached to the smoke outlet of the roasting device too. In that embodiment, it is preferred that the duct comprises openings to establish communication with ambient air at the connection between the smoke outlet of the roasting device and the inlet of the duct. That can guarantee that roasting happens under atmospheric pressure and is not influenced by the smoke collecting device drawing smoke from the roasting device.

In one embodiment, the smoke collecting device can be part of the smoke treating unit, both forming a smoke treating module. This module can be independent from the roasting device and can be used to treat the smoke of any roasting device.

In one first embodiment of the roasting apparatus, the smoke treating unit comprises:
- a contaminants treating device configured to prevent the dispense of coffee aromas in the room, and
- a smoke diverting device positioned upstream said contaminants treating device configured to prevent the dispense of coffee aromas in the room, said smoke diverting device being configured to divert a part of the smoke collected by the smoke collecting device away from said contaminants treating device configured to prevent the dispense of coffee aromas in the room and directly to the outside of the roasting apparatus.

Usually the smoke treating unit comprises a duct guiding the smoke from the smoke collecting device to the contaminants treating device.

Usually, the smoke diverting device comprises a valve device and the controller is arranged to control said valve device to dispense in the room a part of the whole quantity of smoke produced during the time of the step of roasting without having this smoke treated by the contaminants treating device configured to prevent the dispense of coffee aromas in the room. Consequently, the control of the valve enables the dispense of aroma in the room.

Preferably, the smoke diverting device comprises a bypass duct and a valve device.

The bypass duct is connected at its upstream side between the smoke collecting device and the contaminants treating device and at its downstream side to the outside of the roasting apparatus. Accordingly, when the roasting apparatus is positioned in a room, the bypass duct enables the discharge of a part of the collected smoke into an indoor environment, in particular the discharge of aromas.

The valve device can be an on/off valve positioned to either close or open the bypass duct. As a result, either all the smoke is directed to and treated by the contaminants treating device, or a part of the smoke can flow through the bypass duct.

Alternatively, the valve device can be a split flap enabling the split of one part of the smoke to the contaminants treating device and another part to the outside of the roasting apparatus. The position of this split valve can be changed to control the parts of the non-treated smoke and the treated smoke.

Preferably, the roasting apparatus comprises at least one sensor configured for monitoring the level of at least one air contaminant and the controller is arranged to control the smoke treating unit, preferably the valve device, based on at least the monitored level of said at least one air contaminant.

Sensor(s) can be positioned at the following positions:
- at the smoke outlet of the roasting device or at the inlet of the smoke treating unit, and/or
- downstream the contaminants treating device, and/or
- in the room and outside the roasting apparatus.

In particular, the monitored level of said at least one air contaminant can be compared to a threshold value, and the actuation valve device can be controlled based on this comparison. The threshold value can be defined on the basis of the volume of the room, the ventilation of the room and local health regulations.

The control of the actuation of the valve can consist of:
- increasing or decreasing the part of the whole smoke treated by the contaminants treating device, and/or
- modulating the period of actuation of the valve.

In one embodiment, the roasting apparatus can comprise a coffee beans identification device configured for obtaining information about the coffee beans introduced in the roasting device, and the controller of the apparatus is arranged to:
- to obtain information about the coffee beans introduced in the roasting device in order to determine directly or indirectly:
  - the heating profile to be applied, and
  - the level of air contaminants produced in the course of said heating profile or the smoke treatment to be applied, and
- to heat said coffee beans according to the determined heating profile and to control the smoke treating unit, preferably the valve device, based on the determined level of air contaminants produced in the course of said heating profile or the determined smoke treatment.

According to one embodiment, the valve device can be configured:
- to guide all the smoke to the contaminants treating device configured to prevent the dispense of coffee aromas in the room, when the valve device is not actuated, and
- when the valve device is actuated, to guide a part of the smoke to the smoke diverting device and the rest of the smoke to the contaminants treating device configured to prevent the dispense of coffee aromas in the room.

For example, when the valve device is actuated, 20% of the volume of the smoke can be directed to the smoke diverting device and 80% can be directed to the contaminants treating device configured to prevent the dispense of coffee aromas in the room.

The valve can be actuated during the first period of the heating step of the process described above. As a result, a part of the smoke is enough to supply the room with the pleasant aroma whereas the rest of the smoke can be treated to avoid built-up of contaminants in the room.

According to another embodiment, the valve device can be configured:
- to guide all the smoke to the smoke treating unit, when the valve device is not actuated, and
- to guide all the smoke to the smoke diversion unit, when the valve device is actuated. In this configuration, the valve can be actuated at a specific frequency—for example 500 Hz—during the first period of the heating step of the process described above. As a result a part of the smoke is enough to supply the room with the pleasant aroma whereas the rest of the smoke can be treated to avoid built-up of contaminants in the room.

In a third aspect, there is provided a smoke treating unit comprising:
- a smoke collecting device configured to be connectable to the smoke outlet of a roasting device,
- a contaminants treating device configured to treat the smoke produced in a roasting device and to prevent the dispense of air contaminants, including coffee aromas, in a room, and
- a smoke diverting device positioned between the smoke collecting device and said contaminants treating device configured to prevent the dispense of coffee aromas in the room, said smoke diverting device being configured to divert a part of the smoke collected by the smoke collecting device away from said contaminants treating device configured to prevent the dispense of coffee aromas in the room and directly to the outside of the smoke treating unit,
- a controller arranged to control said smoke treating unit, wherein the controller is adapted to dispense in the room a part of the whole quantity of smoke produced during the time of the step of roasting without having this smoke treated by said contaminants treating device configured to prevent the dispense of coffee aromas in the room.

In the present application:

the terms "a part" of an entity represents a portion strictly inferior to 100% of said entity and does not encompass this whole entity.

the terms "at least a part" of an entity encompasses any portion inferior or equal to 100% of said entity and encompasses this whole entity.

the terms "contaminants treating device configured to prevent the dispense of coffee aromas in the room" relates to contaminants treating device configured to treat the smoke produced in a roasting device and to prevent the dispense of air contaminants, including coffee aromas, in the room.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
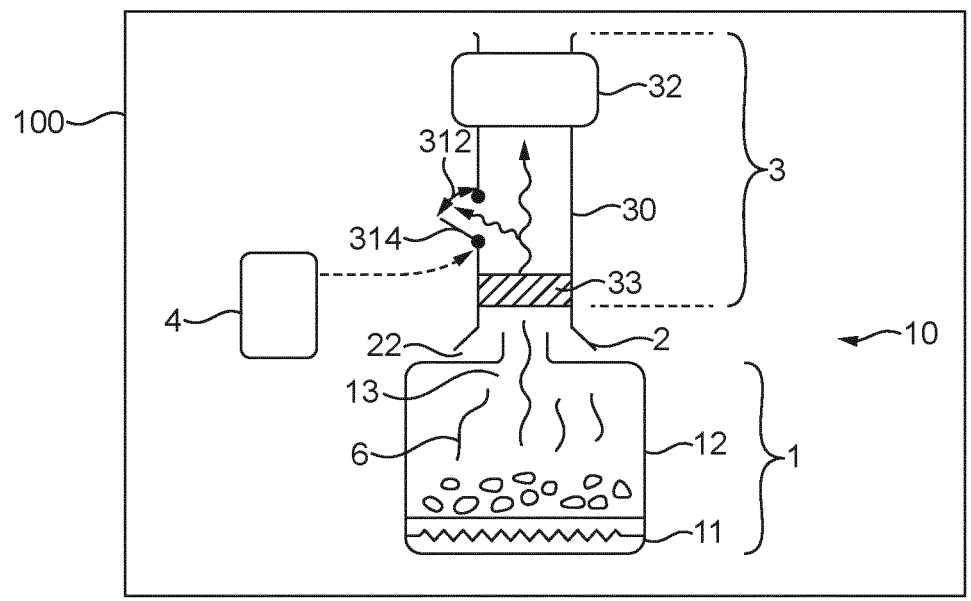
FIGS. 1 to 6 are schematic drawings of different embodiments of the roasting apparatus and method according to the invention, FIG. 7 are curves illustrating a heating profile and corresponding VOCs and PM emissions profiles and alternative smoke treatment profiles, FIG. 8 schematically illustrates the process unit of the roasting apparatus.
Figure 4:
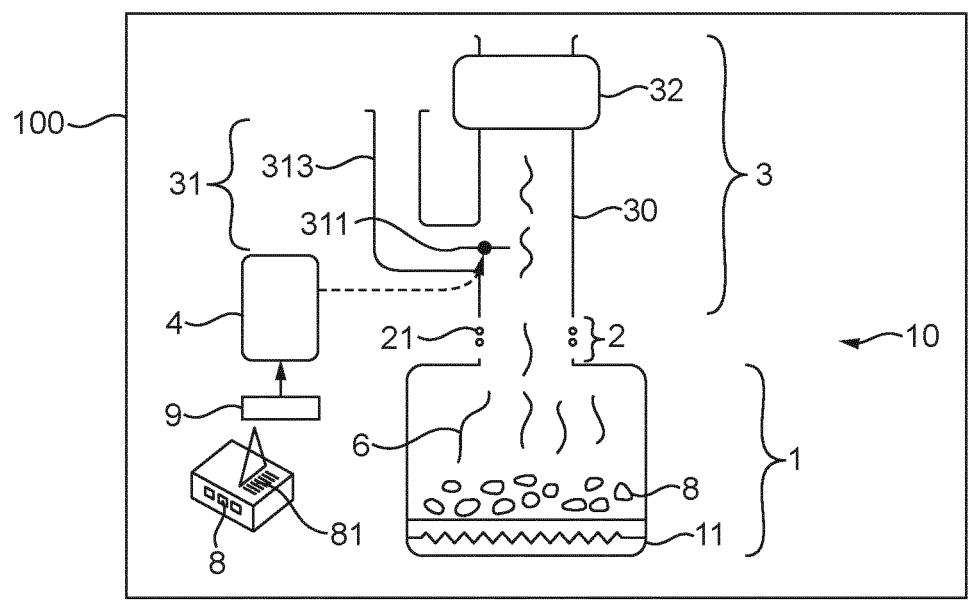

FIG. 1 illustrates schematically a roasting apparatus 10 during the roasting operation. The apparatus comprises a roasting device 1 configured to roast beans 8. The roasting device comprises a roasting chamber 12 enabling the introduction of coffee beans and their heating. A heater 11 is provided to heat the beans. As mentioned above, any type of roasting chamber and heating can be implemented. Yet, preferably, the heater is an electrical heater. During roasting, coffee beans 8 generate smoke 6. This smoke 6 is collected by a smoke collecting device 2. In the illustrated embodiment, the collecting device 2 is a simple hood positioned above the smoke outlet 13 of the roasting chamber in order to capture the smoke. The hood is positioned so as to keep a gap 22 with the outlet 13 and provides connection with ambient atmosphere. Other types of smoke collecting device can be used; for example FIG. 4 illustrates a collecting device 2 comprising a duct attached to the outlet 13 of the roasting chamber, this duct comprising openings 21 to establish communication with ambient atmosphere. The design of the chamber can be configured to urge smoke to the smoke outlet.

The smoke collecting device 2 guides the smoke to a smoke treatment unit 3. The smoke treatment unit 3 comprises a duct 30 and a contaminants treating device 32 to treat the smoke produced in the roasting chamber and to prevent the dispense of said air contaminants, including coffee aromas, in the room 100 where the roaster operates. The duct 30 guides the smoke through the contaminants treating device 32. After treatment by the unit 3, the smoke can be evacuated in the room 100 safely or even outside the room. If evacuated in the room, the treated smoke is preferably cooled, usually by mixing the flow of treated smoke with a flow of ambient fresh air before the smoke flows out of the smoke treating unit 3.

In the embodiment of FIG. 1, the smoke treating unit 3 comprises two contaminants treating unit 32, 33 configured to treat the smoke 12 and to prevent the dispense of air contaminants in the room. The first contaminants treating unit is a filter 33 configured for filtering fines and particulate matters but not—or at least very few—compounds providing aromas. Filters configured for trapping particulate matters can be high efficiency particulate accumulator (HEPA) filters, ultrafine steel wool media filter or an electrostatic filter. The filter is usually at the upstream side of the smoke treating unit 3. The second contaminants treating device is a catalytic converter 32 positioned at the downstream side of the filter 33 and converting all the VOCs in less harmful components including aromas compounds.

The smoke treating unit 3 comprises a smoke diverting device 31 positioned between the roasting device 1 and the second contaminants treating device 32. This smoke diverting device 31 is configured to divert a part of the smoke 6 collected by the smoke collecting device 2 away from second contaminants treating device 32 and directly to the outside of the roasting apparatus 10 inside the room 100. In the illustrated embodiment of FIG. 1, this smoke diverting device 31 is a split flap 314 configured to create an opening 312 in the duct of the smoke treating unit 3. This opening 312 enables a part of the smoke to flow outside the roasting apparatus 10 without being treated by the second contaminants treating device 32. If the smoke comprises aroma compounds, the aromas are dispensed in the room 100 around the roasting device.

The roasting apparatus 10 comprises a controller 4 adapted to control the opening 312 in the duct 30 of the smoke treating unit and, as a result, to control the dispense in the room 100 of a part of the whole quantity of smoke produced during the time of the step of roasting without having this smoke treated by the second contaminants treating device 32 which is configured to convert all the VOCs compounds. In the illustrated embodiment of FIG. 1, the controller 4 can control a motor configured for moving the position of the split flap 314 between a fully closed position (meaning no opening in the duct 30), a fully opened position and intermediate positions. The controller can be configured to move the split flap 314 in certain positions during certain periods of time to reach the objective of providing aroma in the room while avoiding the presence of high level of harmful contaminants inside the room.

The size of the cross section of the opening 312 can be set to get an optimised ratio of aroma dispense and air contaminants treatment. This size can depend from the specific implementation of the roasting process like:

the size of the room. The volume of the room is to be taken into account because smoke dispensed in the room dilutes within air present in the room. It is possible to dispense a bigger volume of non-treated smoke inside a room with a big internal volume.

the presence and the type of air ventilation of the room. If the room comprises an air ventilation device like a fan configured to refresh the atmosphere by introducing fresh air inside the room or by evacuating air from the room to the outside, the power of this air ventilation device can be taken into account. A powerful device can renew the atmosphere very rapidly meaning that a higher quantity of non-treated smoke can be dispensed in the room.

the hour of the day. For example, for customers present in the room, coffee flavours may be more desirable in the morning than in the evening. The operator of the roasting apparatus can decide to dispense aromas in the room or not.

the frequency of the roasts. Too frequent roasting process implementations may create a too strong flavour for customers and operators in the room. At one point, the operator may decide that there are enough aromas in the room.

the quantity of roasted beans. The quantity of aromas and contaminants produced during a roasting process is directly dependent on the quantity of beans roasted in the roasting device. Yet, the level of aroma sufficiently pleasant to be smelt by customers and operators in a room remains usually the same. When an important quantity of coffee beans is roasted (for example 250 g), the percentage of produced smoke to be dispensed without treatment can be decreased compared to a smaller quantity of beans (for example 50 g).

the desired roasting level. Since coffee beans produced at a higher level of roasting (such as dark level) produce higher quantities of harmful components, the percentage of smoke to be dispensed without treatment is strongly reduced at least during a part of the step of heating.

and/or depending on local health regulations about the presence of specific compounds in a public room. As local health regulations can be stricter from one country to another, the percentage of smoke to be dispensed without treatment shall be reduced accordingly.

Figure 2:
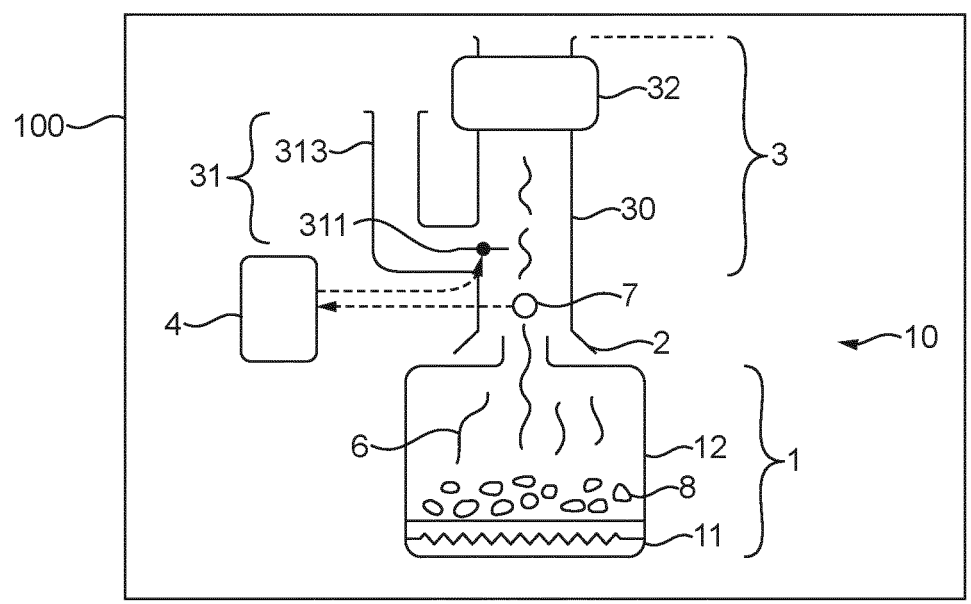

FIG. 2 illustrates schematically an alternative embodiment of the roasting apparatus 10 of FIG. 1. The roasting apparatus is similar to the roasting device of FIG. 1 except that the smoke diverting device 31 of the smoke treating unit comprises a bypass duct 313 comprising a valve 311 configured to either open or close the bypass duct 313 (in FIG. 2, this valve is positioned to open the bypass duct and dispense aromas in the room) In addition, the roasting device comprises a sensor 7 monitoring the level of at least one air contaminant inside the smoke 6 produced in the roasting device 1. This level is monitored by the controller 4 of the roasting apparatus and, based on this monitored level, the controller 4 controls the valve 311. In particular, the closure of the bypass duct 313 by the valve 311 can be actuated by the controller 4 if the level of the least one air contaminant is superior to a predetermined threshold value. If not, the valve 311 can be positioned in the open position and, consequently, smoke and aroma can be dispensed in the room.

Although not represented, the smoke treating unit 3 can comprise a filter for catching fines and particulate matters at the upstream side of the duct 30 as described and illustrated in FIG. 1. Preferably, this filter is positioned downstream the sensor 7.

Figure 3:
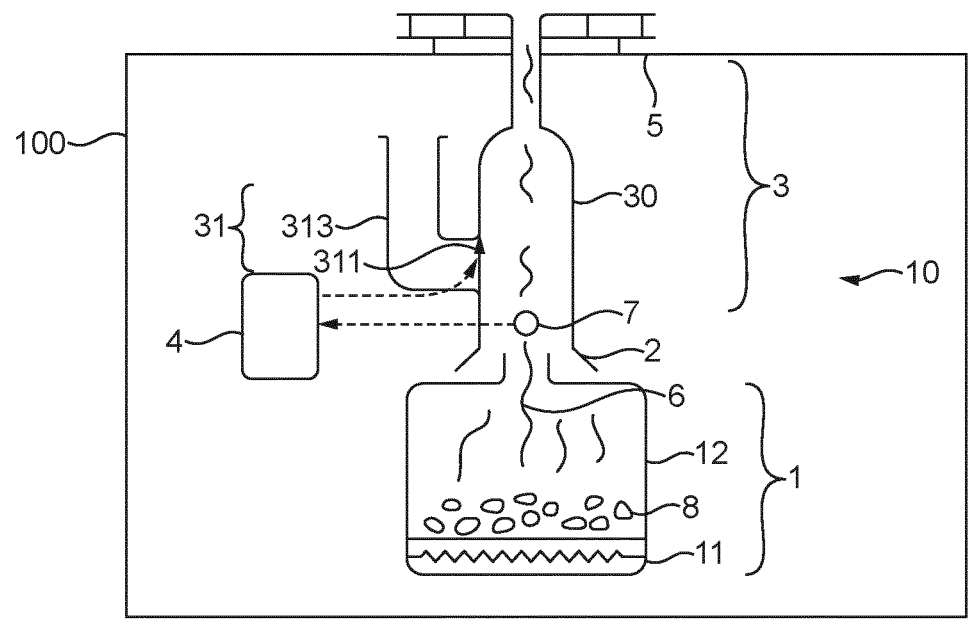

FIG. 3 illustrates schematically an alternative embodiment of the roasting apparatus 10 of FIG. 2. The roasting apparatus 10 is similar to said roasting apparatus except that the smoke treating unit 3 treats the smoke by evacuating the smoke 6 to the outdoor outside the room 100. In this embodiment, the duct 30 of the smoke treating unit passes through the wall 5 of the room in which the roasting apparatus is operated.

On the contrary, the outlet of the bypass duct 313 emerges inside the room 100 in which the roasting apparatus 10 is operated so that aromas can be dispensed and smelt when the valve 311 of the bypass duct is opened. In FIG. 3, the valve 311 is positioned to close the bypass duct and prevent dispensing aromas in the room.

Although not represented, the smoke treating unit 3 can comprise a filter for catching fines and particulate matters at the upstream side of the duct 30 as described and illustrated in FIG. 1. Preferably, this filter is positioned downstream the sensor 7.

FIG. 4 illustrates schematically an alternative embodiment of the roasting apparatus 10 of FIG. 2. The roasting apparatus does not comprise a sensor to monitor the level of air contaminants but it comprises a means to identify coffee beans 8 introduced in the roasting chamber. For example, this means is code reader 9 configured to read a code 81 (barcode, QRC, RFID, etc.) from the sachet of the coffee beans for identifying the coffee beans 8 introduced in the roasting chamber 12. Based on the identification of the beans (for example, references of the beans), information can be determined from a memory stored in the roasting device or from a remote server the roasting apparatus 10 is connected to. In an alternative embodiment (not illustrated), the code can be read by a mobile device and then the code can be communicated to the roasting apparatus 10 through near field communication (Wi-Fi, Bluetooth).

In particular based on the information, the controller is configured to determine:
the heating profile to be applied to the coffee beans 8, and
the level of air contaminants produced in the course of this heating profile to be applied or the smoke treatment to be applied in the course of this heating profile to be applied.

After having collected these pieces of information, the controller 4 is arranged to apply the determined heating profile—that is to apply determined temperatures according to time—and to control the valve device 311 based on at least the determined level of air contaminants produced in the course of said heating profile or the determined smoke treatment to be applied.

The determined heating profile provides an optimised roasting of the beans and, based on this determined heating profile, an analysis of the air contaminants in the smoke along the heating profile can be determined too in advance. This determined analysis of the emission of the air contaminants during heating can be directly supplied to the controller 4 of the roasting device so that the controller 4 is able to calculate therefrom a profile of actuation of the valve device 311. Alternatively, the profile of actuation of the valve device 311 can be communicated to the controller 4 as such so that the controller 4 applies this profile during the beans roasting; for example, the predetermined profile can consist in instruction such as: switch on the valve 311 (that is closing the bypass duct 313) at time t1 of the roasting only (meaning having the bypass duct opened from t=0 to t1) and until the end of the roasting (meaning having the bypass duct closed from t1 to the end).

Although not represented, the smoke treating unit 3 can comprise a filter for catching fines and particulate matters in the duct and upstream the valve device as described and illustrated in FIG. 1.

In alternative embodiments, the roasting device can comprise means to detect the first and the second cracks of the coffee beans while they are roasted. Any known means like colour detection, particulate matters detection, sound detection, . . . can be used. Based on the information provided by the cracks detection means, the bypass duct can be closed or not and smoke treatment can be applied to the whole smoke or not.

Figure 5:
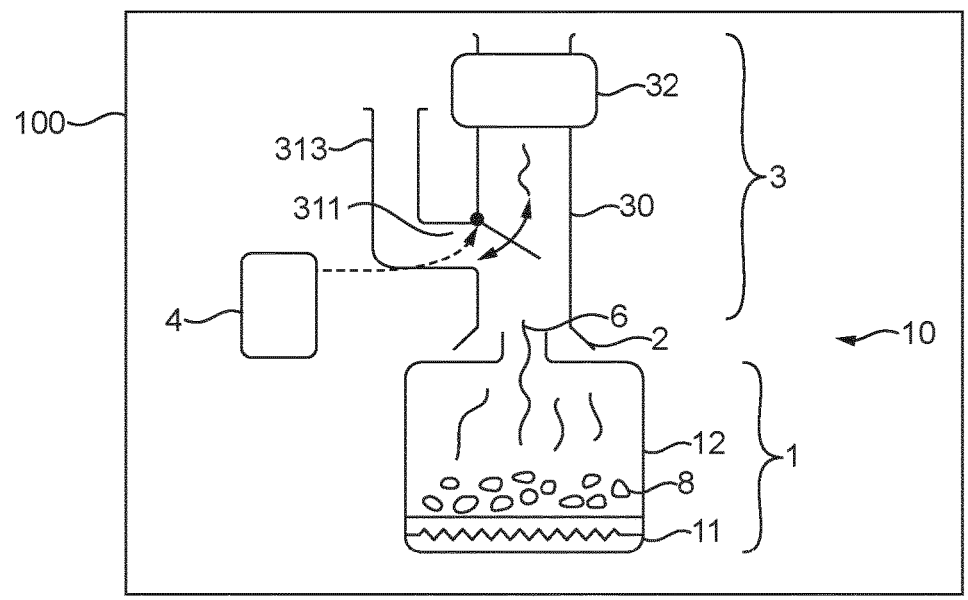

FIG. 5 illustrates schematically an alternative embodiment of the roasting apparatus 10 of FIG. 2 except that the valve device 311 is a split valve positioned in order to enable the dispensing of 0 to 100% volume of smoke to the bypass duct 313 and the complimentary part to the contaminants treating device 32.

Although not represented the smoke treating unit 3 can comprise:
- a sensor monitoring the level of at least one air contaminant inside the smoke 6 produced in the roasting device 1, as illustrated in FIG. 2 and/or
- a filter for catching fines and particulate matters at the upstream side of the duct 30 as described and illustrated in FIG. 1. Preferably, this filter is positioned downstream the sensor 7.

Figure 6:
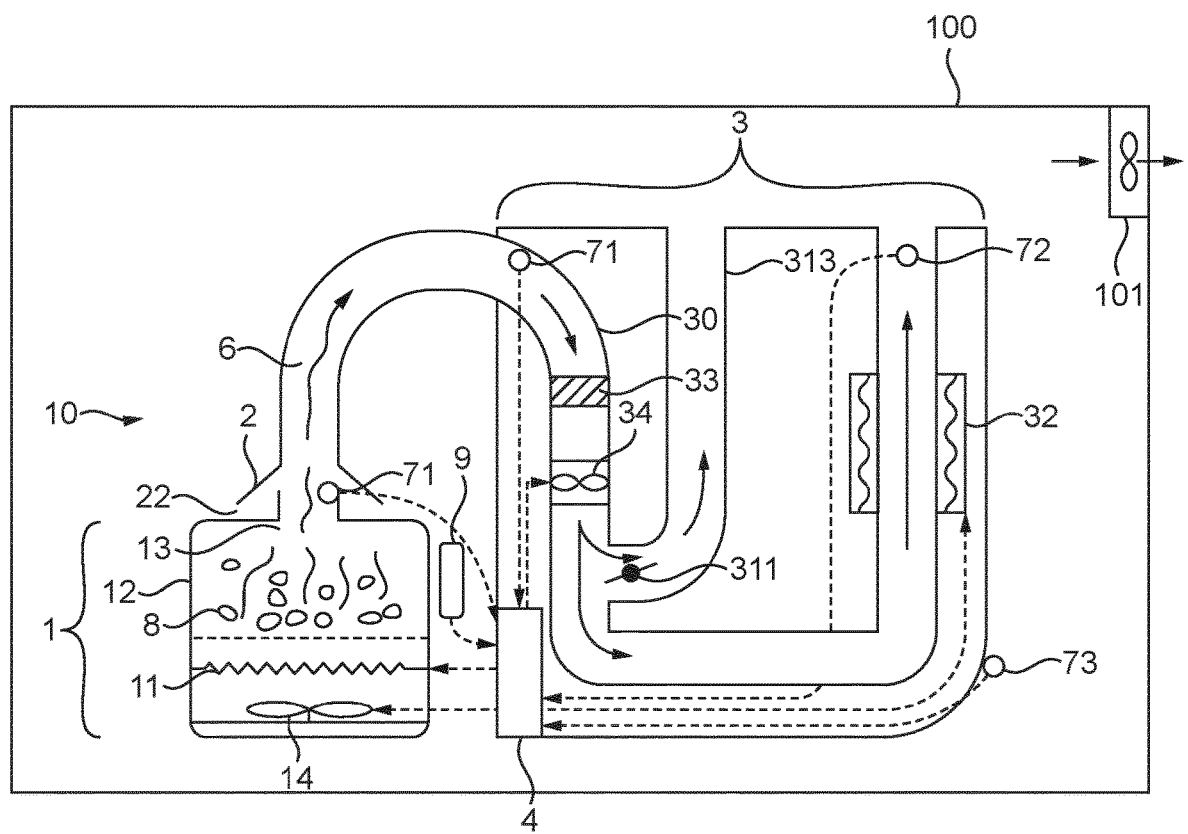

FIG. 6 illustrates a specific embodiment of the roasting apparatus 10 according to the present invention.

The roasting apparatus 10 is positioned inside a room 100 like a shop, a café or a restaurant room.

FIG. 6 illustrates schematically a roasting apparatus 10 during the roasting operation. The apparatus comprises a roasting device 1 configured to roast coffee beans 8. The roasting device comprises a roasting chamber 11 enabling the introduction of coffee beans and their heating. The roasting device 1 comprises a heater 11 and a fan 14 in order to create a fluidized bed of hot air to heat and mix the coffee beans inside the roasting chamber 12. During roasting, coffee beans 8 generate smoke 6.

This smoke 6 is collected by a smoke collecting device 2 In the illustrated embodiment, this collecting device 2 is a simple hood positioned above the smoke outlet 13 of the roasting chamber.

The smoke collecting device 2 guides the smoke to a smoke treatment unit 3. The smoke treatment unit 3 comprises a duct 30 to guide the smoke 6 and a fan 34 to draw the smoke from the smoke collecting device 2 to the smoke treating unit 3.

In the smoke treatment unit 3, the smoke is guided to:
- firstly, to a filter 33 configured for filtering fines and particulate matters but not or few compounds providing coffee aromas. Filters configured for trapping particulate matters can be high efficiency particulate accumulator (HEPA) filters, ultrafine steel wool media filter or electrostatic filter, and
- then, to a catalytic converter 32 positioned at the downstream side of the filter 33 and that converts all the VOCs in less harmful components including all aroma compounds.

Preferably, the fan 34 that draws the smoke from the smoke collecting device 2 to the smoke treating unit 3 is positioned after the filter and before the bypass.

Between the filter 33 and the catalytic converter 32, the smoke treating unit comprises a bypass duct 313 configured to divert a part of the smoke 6 collected by the smoke collecting device 2 away from the catalytic converter 32 and directly to the outside of the roasting apparatus 10, that is inside the room 100. A valve 311 is positioned at the upstream side of the bypass duct and is configured to either open or close the bypass duct 313. When the valve opens the bypass duct a part of the smoke 6 can flow outside the roasting apparatus 10 without being treated by the catalytic converter 32. If the smoke comprises aroma compounds, the aromas are dispensed in the room around the roasting apparatus. When the valve closes the bypass duct the whole smoke 6 flows to the catalytic converter 32 that destroys all VOCs compounds therefrom including coffee aromas.

The shape and the orientation of the bypass duct, its position relatively to the fan 34 can be optimised to urge a certain amount of the smoke 6 in direction of the bypass.

The roasting apparatus comprises a means 9 to identify coffee beans 8 introduced in the roasting chamber. For example, this means can be a code reader 9 configured to read a code (barcode, QRC, RFID, etc.) from the sachet of the coffee beans for identifying the properties of the coffee beans 8 introduced in the roasting chamber 12 as earlier described in relation with FIG. 4. Alternatively this means can be a means to input information about the coffee beans 8 introduced in the roasting chamber 12, like a display enabling the input of coffee beans references.

Whatever the sort of identification of the beans, the controller 4 is configured to determine the heating profile of said beans introduced in the roasting device and to determine the level of air contaminants produced in the course of said heating profile or the smoke treatment to be applied in the course of said heating profile.

The roasting apparatus 10 comprises a controller 4 adapted to control the roasting device 1. Based on the identification of the beans through the means 9 to identify coffee beans, the controller is configured to apply the roasting profile of said beans by control of the fan 14 and the heater 11 of the roasting device.

In addition, the controller is configured to control the smoke treating unit 3. Based on the identification of the beans through the means 9 to identify coffee beans and the determination directly or indirectly of a smoke treatment, the controller is configured to apply said determined smoke treatment by controlling the opening of the valve 311 in the course of the heating process. In this illustrated embodiment, the smoke treatment provides the period(s) of time the valve 311 opens the bypass duct 313.

The smoke treatment can be dynamically adapted during the roasting process based on the monitoring of contaminants levels by sensors 7 positioned at different places of the apparatus. In the illustrative embodiment, a sensor 71 is positioned at the upstream inlet of the smoke treating unit or at the outlet of the roasting chamber, a sensor 72 is positioned at the downstream outlet of the smoke treating unit, and a sensor 73 is positioned outside the apparatus 10 inside the room 100. Based on the dynamic monitoring of the contaminants levels through these sensors 71, 72, 73, the controller is configured to modify the determined smoke treatment in order to guarantee a safe release of smoke inside the room. In particular, some threshold values can be defined for the level of harmful components like CO, $CO_2$, NO, $NO_2$, SON. If these values are overpassed, the controller is configured to move the valve 311 of the bypass duct to a position closing this duct 313.

Before the roasting process is implemented, the smoke treatment such as determined from the identification of the beans can be adapted based on specific local implementation such as: the volume of the room 100, the presence and the flow rate of a ventilation 101 in the room, local health regulation and other parameters such as mentioned above.

In the present illustrated embodiment, by "adapted", it is essentially meant that the period of time (and indirectly the volume of smoke) wherein the smoke is dispensed in the room without being treated by the converter 32, that is the period of time the valve 311 is opened, can be changed. In other embodiments, by "adapted", it can be meant that the position of the split valve can be changed in order to lead more or less volume of smoke to the bypass duct. More generally, the controller controls too the catalytic converter 32 so that its temperature is sufficiently high to efficiently treat contaminants when the roasting coffee beans produce a smoke that needs to be treated.

Similarly, the controller controls too:
- the fan 33 of the smoke treating unit so that this unit is able to suck smoke when it is produced inside the roasting device,
- the fan 34 of the smoke treating unit when the smoke is treated and begins to be evacuated inside the room.

Although FIG. 6 represents the roasting apparatus 10 as one single apparatus comprising three sub-parts: the roasting device 1, the smoke collecting device 2 and the smoke treating unit 3, the invention relates too to a roasting apparatus comprising at least two separated modules: the roasting device 1 on one hand and the smoke treating unit 3 on the other hand. The smoke collecting device 2 can be part of either one of said modules or can be a third independent module.

Figure 7:
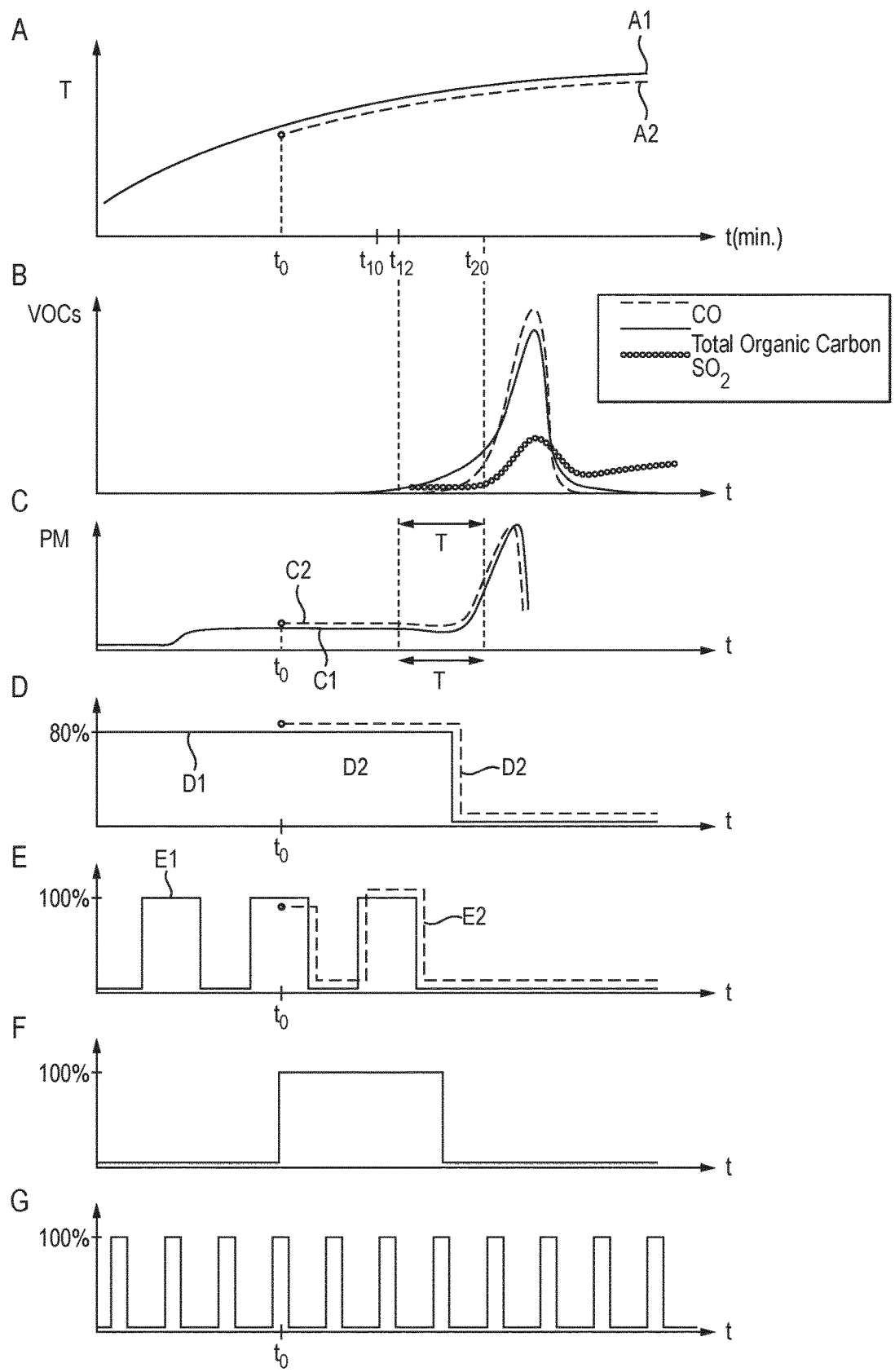

FIG. 7 illustrates different curves applied or observed during the roasting of coffee beans.

Curves A illustrates the heating profile (temperature versus time) for roasting green coffee beans (A1 plain line) and partially pre-roasted beans of the same origin (A2 dotted line): it corresponds to the temperature to be applied in the roasting chamber $t_{11}$ is the time corresponding to the start of the first crack, $t_{12}$ is the time corresponding to the end of the first crack, $t_2$ is the time corresponding to the start of the second crack.

When the beans have been partially pre-roasted, this heating profile (A2) is shorter in time: the first part of the curve is not applied, yet the heating profile starts before $t_{12}$, for example at $t_0$.

Curve B is the VOCs emissions of some compounds in $mg/m^3$ during the roasting of these coffee beans along the same time scale as curves A1, A2: it is apparent that the emissions start after the end $t_{12}$ of the first crack and reach a maximum after the start $t_2$ of the second crack.

Curves C is the PM emissions in $\mu g/m^2$ during the roasting of these coffee beans along the same time scale as curves A1, A2: it is apparent that the emissions start after the end $t_{12}$ of the first crack and reach a maximum after the start $t_2$ of the second crack.

Based on curves B and C, there can be defined:
- a first period of heating wherein the level of contaminants remain low, and
- a second period of heating wherein the level of contaminants increases drastically. This second period of time begins in an interval of time T extending between $t_{12}$, that is the time corresponding to the end of the first crack, and just after $t_2$, that is the time corresponding to the start of the second crack. Accordingly, it is recommended to start applying a treatment of at least a part of the smoke during this interval of time T.

Curves D1, D2 illustrate profiles of treatment of the smoke that can be applied during the heating profile of coffee beans according to curves A1, A2 respectively. The profiles provide the percentage of the smoke dispensed in the room without being treated by the smoke treating unit along the same time scale as corresponding curves A1, A2. In the profile of curves D1, D2, 80% of the volume of the smoke is not treated up to the start $t_2$ of the second crack. Then, 100% of the volume of the smoke is treated. The profiles illustrated by curves D1, D2 can be communicated and applied by the controller 4 of the roasting device when the coffee beans with the roasting profile of curves A1, A2 respectively and the emissions of curves B and C are introduced in the roasting device.

These profiles can be implemented if the roasting apparatus comprises a smoke diverting device as illustrated in FIG. 1 with the split valve opened to enable the diversion of 80% of the smoke or as illustrated in FIG. 2, 3, 4 or 6 with the bypass duct of the smoke diverting device designed to enable the diversion of 80% in volume of the smoke when the valve 311 is opened.

Curves E1, E2 illustrate another profile of treatment of the smoke that can be applied during the heating profile of coffee beans according to curves A1, A2 respectively. In the profile of curves E1, E2, up to the start $t_2$ of the second crack, the smoke is dispensed in a pulsed mode to the room without being treated. During pulsed period, 100% of the volume of the smoke is dispensed in the room. The profiles illustrated by curves D1, D2 can be communicated and applied by the controller 4 of the roasting apparatus when the coffee beans with the roasting profile of curves A1, A2 respectively and the emissions of curves B and C are introduced in the roasting device.

These profiles can be implemented with a roasting apparatus comprising a split flap as illustrated in FIG. 5.

Curve F illustrates another profile of treatment of the smoke that can be applied during the heating profile of green coffee beans according to the corresponding curve A1. The profile is comparable to the profile of curve D1 except that the smoke is treated from the beginning of the heating up to the beginning of the first crack; as a result, the particular aromas produced at the beginning of the heating are not dispensed and smelt. Then, during the first crack and until the end of the second crack, 100% of the volume of the smoke is not treated and the pleasant aromas can be smelt. After the second crack, the smoke is treated again in order to prevent the emissions of VOCs and particulate matters. This profile can be implemented if the roasting device comprises a split flap as illustrated in FIG. 5.

Curve G illustrates another profile of treatment of the smoke that can be applied during the heating profile of coffee beans according to curve A1 or A2. According to this profile, the valve device is actuated in a pulse mode during the whole heating step at a high frequency. This profile can be implemented with the roasting apparatus comprises a split flap as illustrated in FIG. 5 where 100% in volume of the smoke can be dispensed without treatment.

Similar profiles can be implemented with a roasting apparatus comprising a valve as illustrated in FIG. 2, 3 or 4, the percentage of dispensed non-treated smoke being inferior to 100% in volume.

Control System of Roasting Apparatus

Figure 8:
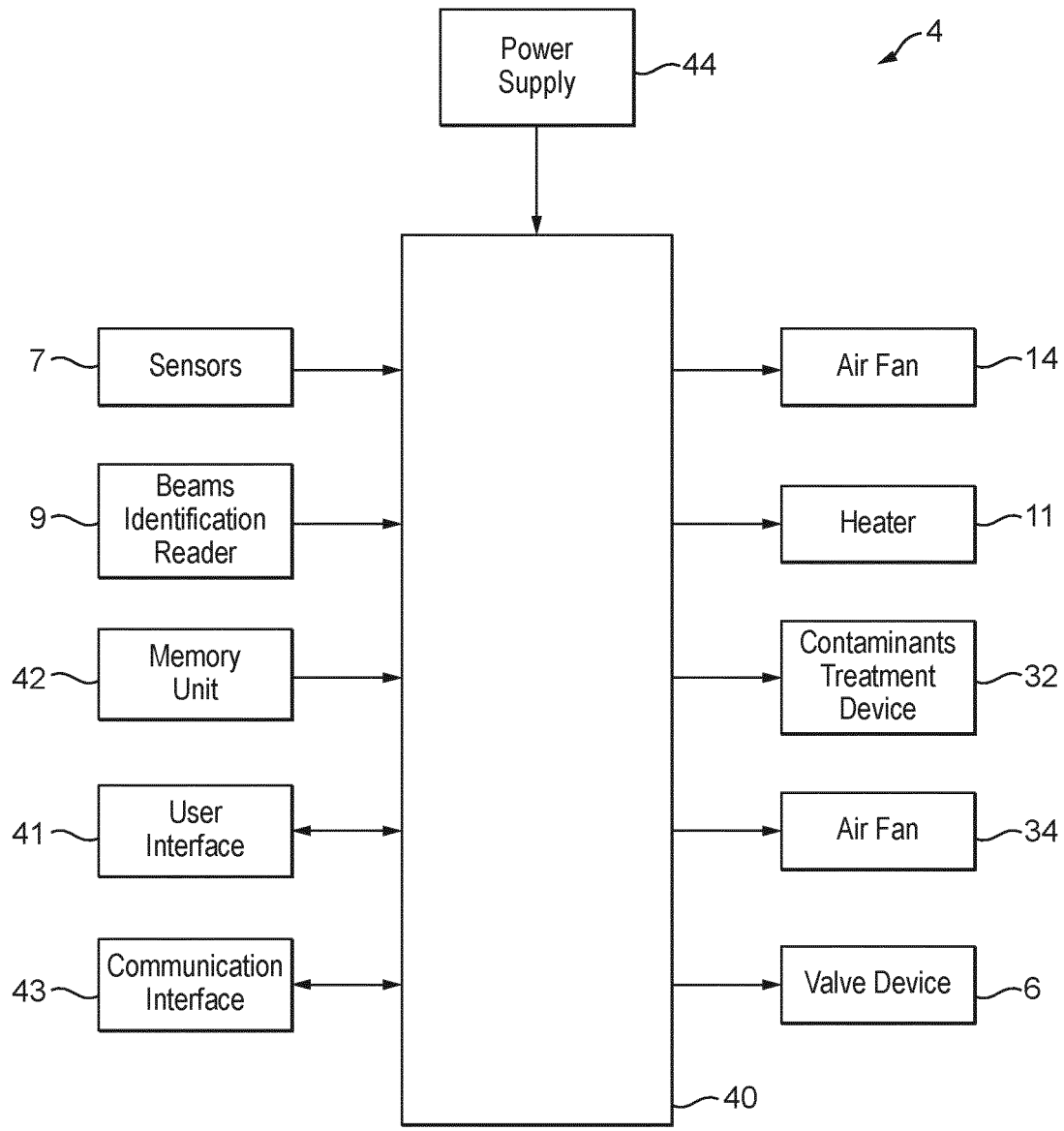

With reference to FIGS. 6 and 8, the controller or control system 4 will now be considered: the controller 4 is operable to control the components of the roasting apparatus 10 to roast coffee beans. The controller 4 typically comprises: a user interface 41, a processing unit 40, a power supply 44, a memory 42, optionally a communication interface 43 for remote connection.

The user interface 41 comprises hardware to enable a user to interface with the processing unit 40, by means of user interface signal. More particularly, the user interface receives commands from a user, the user interface signal transfers the said commands to the processing unit 40 as an input. The commands may, for example, be information about an instruction to execute a roasting process and/or to adjust an operational parameter of the roasting apparatus 10 and/or to power on or off the roasting apparatus 10. In particular, the instruction can relate to the instruction to release aromas in the room or not during the roasting process, the desired level of roasting of the beans. The operational parameter can relate to information about the size of the room, the ventilation, the local health regulations, the quantity of beans introduced in the roasting device. The processing unit 40 may also output feedback to the user interface 41 as part of the roasting process, e.g. to indicate the roasting process has been initiated or that a parameter associated with the process has been selected or to indicate the evolution of a parameter during the process.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 20 can be formed as one unit or a plurality of discrete units. A part of the user interface can also be on a mobile app.

The sensors 7 are operable to provide an input signal to the processing unit 40 for monitoring of the roasting apparatus. The input signal can be an analogue or digital signal. The sensors 7 typically comprise: a temperature sensor in the roasting device 1 and the contaminants level sensors 71, 72, 73.

The processing unit 40 generally comprise memory, input and output system components arranged as an integrated circuit, typically as a microprocessor or a microcontroller. The processing unit 40 may comprises other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programed logic or to additionally comprise programmed logic. The processing unit 40 may also comprise one or more of the aforementioned integrated circuits. An example of the later is several integrated circuits is arranged in communication with each other in a modular fashion e.g.: a slave integrated circuit to control the user interface 41 in communication with a master integrated circuit to control the roasting apparatus 10.

The processing unit 40 generally comprises a memory unit 42 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconductor) memory. For programmable logic devices the instructions can be stored as programmed logic.

The instructions stored on the memory unit 42 can be idealised as comprising a coffee beans roasting program. The coffee beans roasting program can be executed by the processing unit 40 in response to the said input, (the commands from the user interface 41, and/or the signal of the sensors 7 such as temperature, contaminants levels). Execution of the coffee beans roasting program causes the processing unit 40 to control the following components: the heater 11, the air fans 14, 34, the contaminants treatment device 32, the valve device 6 of the bypass duct. The coffee beans roasting program can effect control of the said components using extraction information read by identification reader 9 and/or other information that may be stored as data on the memory unit 42 and/or input via the user interface 41 and/or signal of the sensors 7.

The power supply 44 is operable to supply electrical energy to the said controlled components and the processing unit 40. The power supply 44 may comprise various means, such as a battery or a unit to receive and condition a main electrical supply. The power supply 44 may be operatively linked to part of the user interface 41 for powering on or off the roasting apparatus 10.

The communication interface 43 is for data communication of the roasting apparatus 10 with another device/system, which may be a server system or a mobile device (phone, tablet). The communication interface 43 can be used to supply and/or receive information related to the coffee beans roasting process, such as roasting process information, nature of the beans, quantity of beans.

The processing unit or control system 40 is operable to:
receive an input, i.e. the commands from the user interface 41 and/or from the signal of the sensors 7 (particularly the contaminants level sensors 71, 72, 73) and/or from the beans identification reader 9,
process the input according to program code (or programmed logic) stored on the memory unit 42 (or imputed from an external source such as the communication interface 43),
provide an output, which is a roasting process and a smoke treatment. More specifically the output comprises the operation of: the heater 11, the fan 14, the contaminants treatment device 32, the fan 34 and the valve device 6.

More specifically, the control system of the roasting apparatus is configured to:
obtain identification of the type of beans 8 introduced in the roasting device 1,
apply a roasting recipe comprising at least a temperature versus time profile by controlling the roasting device 1,
apply a smoke treatment determined directly or indirectly from the beans identification.

The step of obtaining the identification of coffee beans is performed by the user: the user can enter the information in the user interface 41 of the roasting apparatus manually (name, digits, . . . ) or the user can present a code identifying the coffee beans to the beans identification reader 9 that automatically identifies the beans from the code. The reader 9 can be part of the roasting apparatus or alternatively can be integrated inside a mobile device, said device being in communication with the roasting apparatus 10 through the communication interface.

In the step of applying a roasting recipe comprising at least a temperature versus time profile by controlling the roasting device 1, the roasting recipe is a recipe dedicated to the identified beans. Based on the identification of the beans, this dedicated roasting recipe can be obtained from the memory unit 42 of the roasting apparatus or downloaded from a server through the communication interface 43. In both cases, for example, a correspondence can be established between the identified beans and a specific heating profile in a look up table. Alternatively the recipe can be read by the reader during the step of identification, the recipe being part of the information related to the identification of the beans.

Similarly, in the step of applying a smoke treatment comprising dispensing a part of the smoke produced in the roasting device in the room without treatment by the contaminants treatment device 32, the smoke treatment can be a treatment by default or can be a treatment dedicated to the identified beans. Based on the identification of the beans, this dedicated treatment can be obtained from the memory unit 42 of the roasting apparatus or downloaded from a server through the communication interface 43. In both cases, for example, a correspondence can be established between the identified beans and a specific smoke treatment in a look up table. Alternatively the treatment can be read by the reader during the step of identification, the treatment being part of the information related to the identification of the beans.

In a less preferred embodiment, the smoke treatment can be determined from information about the level of air contaminants produced in the course of the heating profile of the identified beans: a program of determination of the smoke treatment can be executed by the processing unit 40 in response to the said input.

Based on the determined heating profile and the determined smoke treatment, the controller 4 is configured to control:

the heater 11 and the fan 14 to apply this heating profile to the beans, and the valve device 6 of the bypass duct to apply this smoke treatment.

Preferably, the controller 4 is configured to control the time of actuation of the contaminants treatment device 32 of the smoke treating unit and of the heater 11 so that the contaminants treatment device 32 has reached its operative status when the smoke is produced in the roasting device 1.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS roasting apparatus 10
roasting device 1
heater 11
chamber 12
smoke outlet 13
fan 14
smoke collecting device 2
openings 21
gap 22
smoke treating unit 3
duct 30
smoke diverting device 31
valve device 311
opening 312
bypass duct 313
split flap 314
contaminants treating device 32
filter 33
fan 34
controller 4
processing unit 40
user interface 41
memory 42
communication interface 43
powder supply 44
room wall 5
smoke 6
sensor 7
coffee beans 8
code 81
coffee beans identification device 9
roasting apparatus 10
room 100
ventilation fan 101

The invention claimed is:

1. A method for roasting coffee beans with a roasting apparatus, the roasting apparatus being positioned in a room, and the roasting apparatus comprising:
  a roasting device,
  a smoke treating unit comprising a contaminants treating device configured to treat smoke produced in the roasting device and to prevent a dispensing of air contaminants in the room, the air contaminants including coffee aromas;
  a smoke collecting device connected to the roasting device and configured to collect the smoke produced in the roasting device; and
  a smoke diverting device positioned between the smoke collecting device and the contaminants treating device, the smoke diverting device configured to divert a part of the smoke collected by the smoke collecting device away from the contaminants treating device and directly to an outside of the roasting apparatus;
  the method comprising:
    introducing the coffee beans in the roasting device;
    heating the coffee beans during a time; and
    diverting, by the smoke diverting device, the part of the smoke away from the contaminants treating device and directly to the outside of the roasting apparatus, wherein the part of the smoke produced during the time of the heating step is dispensed in the room without being treated by the contaminants treating device configured to prevent the dispensing of the coffee aromas in the room.

2. The method according to claim 1, wherein the contaminants treating device is selected from the group of an afterburner, a catalytic converter, or a device configured to divert the air contaminants away from the room or to a filter configured to trap the coffee aromas.

3. The method according to claim 1, wherein during a part of the time of the step of heating, the part of the smoke produced in the roasting device is dispensed in the room without being treated by the contaminants treating device configured to prevent the dispensing of the coffee aromas in the room.

4. The method according to claim 3, wherein, during a sub-step of the step of heating, the coffee aromas are produced, and during the sub-step, the part of the smoke produced in the roasting device is dispensed in the room without being treated by the contaminants treating device configured to prevent the dispensing of the coffee aromas in the room.

5. The method according to claim 3, wherein the time of the heating step consists of a first period of time and a second period of time, and wherein:
  during a part of the first period of time, the part of the smoke produced in the roasting device is dispensed in the room without being treated by the contaminants treating device configured to prevent the dispensing of the coffee aromas in the room, and during the second period of time, a further part of the smoke is treated by the contaminants treating device configured to prevent the dispensing of the coffee aromas in the room.

6. The method according to claim 5, wherein the second period of time of the heating step occurs after a first crack of the coffee beans.

7. The method according to claim 1, wherein during the time of the heating step, the part of the smoke produced in the roasting device is dispensed in the room without being treated by the contaminants treating device configured to prevent the dispensing of the coffee aromas in the room and a further complementary part of the smoke produced in the roasting device is treated by the contaminants treating device configured to prevent the dispensing of the coffee aromas in the room.

8. The method according to claim 1, wherein:
the roasting device comprises an air contaminants level monitoring unit configured for measuring a level of contaminants in the smoke, and
during the heating step:
the level of contaminants in the smoke is measured and compared to a threshold value to provide a comparison, and
a treatment of the smoke by the smoke treating unit is controlled based on the comparison.

9. The method according to claim 1, wherein the coffee beans introduced in the roasting device are partially pre-roasted beans, the partially pre-roasted beans having been obtained by heating green coffee beans and stopping the heating of the green coffee beans before an end of a first crack of the green coffee beans.

10. The method according to claim 1, wherein the smoke treating unit comprises a further contaminants treating device configured to prevent dispensing of air contaminants other than coffee aromas in the room.

11. The method according to claim 1, comprising the step of controlling a level of aroma dispensed in the room by setting a ratio of the part of the smoke dispensed in the room without being treated by the contaminants treating device to all of the smoke.

12. A method for roasting coffee beans with a roasting apparatus, the roasting apparatus being positioned in a room, and the roasting apparatus comprising:
a roasting device, and
a smoke treating unit comprising a contaminants treating device configured to treat smoke produced in the roasting device and to prevent a dispensing of air contaminants in the room, the air contaminants including coffee aromas;
the method comprising:
introducing the coffee beans in the roasting device;
heating the coffee beans during a time, wherein the time consists of a first period of time and a second period of time, wherein a part of the smoke produced in the heating step is dispensed in the room without being treated by the contaminants treating device configured to prevent the dispensing of the coffee aromas in the room;
during a part of the first period of time, dispensing the part of the smoke produced in the roasting device in the room without being treated by the contaminants treating device configured to prevent the dispensing of the coffee aromas in the room; and
during the second period of time, treating a further part of the smoke by the contaminants treating device configured to prevent the dispensing of the coffee aromas in the room.

* * * * *